UNITED STATES PATENT OFFICE.

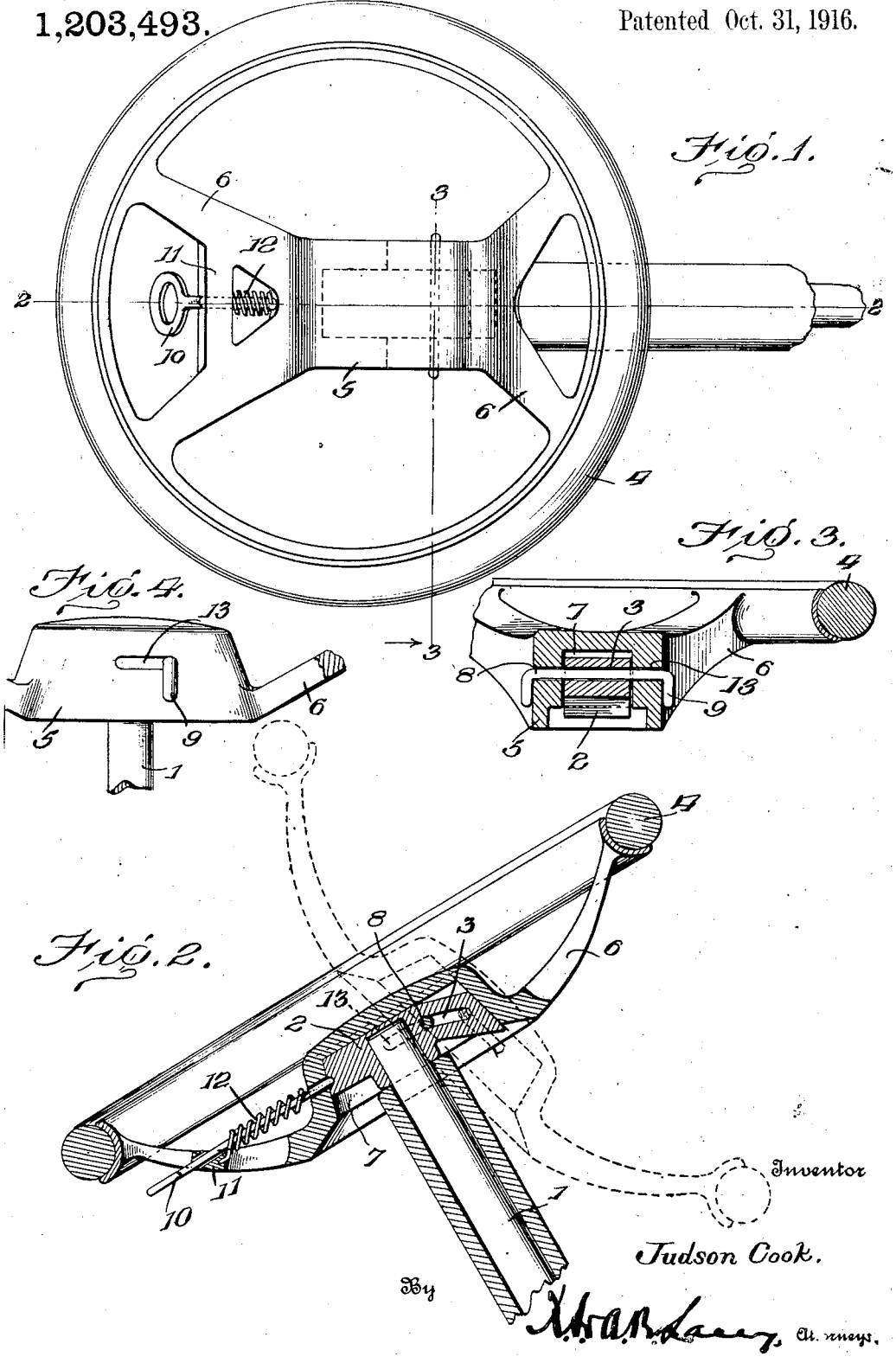

JUDSON COOK, OF LEOMINSTER, MASSACHUSETTS.

STEERING-WHEEL.

1,203,493.   Specification of Letters Patent.   Patented Oct. 31, 1916.

Application filed October 4, 1915. Serial No. 54,014.

*To all whom it may concern:*

Be it known that I, JUDSON COOK, a citizen of the United States, residing at Leominster, in the county of Worcester and State of Massachusetts, have invented certain new and useful Improvements in Steering-Wheels, of which the following is a specification.

This invention has relation to steering mechanism and more particularly to the hand wheel by means of which automobiles and motor craft of various types are steered.

The primary purpose of the invention is to secure ample room between the seat and steering wheel so that ingress and egress to and from the machine are facilitated.

The invention provides novel means between the hand wheel and steering rod which admits of the hand wheel moving forward and occupying an approximately upright position with the result that more room is provided between the seat and the hand wheel so that the operator may enter or leave the machine with greater ease and convenience.

The invention consists of an oblong head secured to the upper end of the steering rod, a steering wheel mounted upon such head to move longitudinally thereof and to tilt thereon so as to occupy an upright position in advance of the steering rod, and novel connecting means between the steering wheel and head for retaining the steering wheel in proper position and securing the same under normal conditions to admit of the hand wheel being used in the accustomed manner.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a top plan view of a steering wheel and steering rod embodying the invention; Fig. 2 is a vertical longitudinal section of the parts illustrated in Fig. 1, the full lines showing the normal position of the steering wheel and the dotted lines indicating the disposition of the steering wheel when moved forward and tilted into upright position; Fig. 3 is a transverse section on the line 3—3 of Fig. 1; Fig. 4 is a detail side view of the body portion of the spider showing the slots in the side walls thereof.

Corresponding and like parts are referred to in the following description and indicated in all the views of the drawings by the same reference characters.

The steering rod 1 and steering wheel mounted thereon may occupy any usual relative position. In accordance with the present invention an oblong head 2 is secured to the upper end of the steering rod 1. The forward portion of the head 2 occupies an approximately horizontal position when such head is in line with a direct course. The rear portion of the head 2 is inclined to the horizontal. A longitudinal slot 3 is formed in the forward portion of the head 2 and receives the fastening which connects the steering wheel to the steering rod. The vertical sides of the head 2 are parallel and the front and rear ends are inclined so as to facilitate the tilting of the steering wheel.

The steering wheel comprises a rim 4 and spider, the latter consisting of a body 5 and arms 6, the latter being attached at their outer ends to the rim 4 in any manner. The body 5 of the spider is oblong and is formed in its lower side with a cavity or recess 7 of a size to receive the head 2. The longitudinal walls of the recess 7 are straight and parallel and touch the vertical side walls of the head 2 when the steering wheel is in normal position. The end walls of the recess 7 are inclined to correspond approximately with the inclination of the extremities of the head 2. A transverse fastening 8 forms connecting means between the steering wheel and head 2 and this fastening preferably consists of a pin having its terminal portions 9 bent at a right angle. The pin or fastening 8 extends through the slot 3 and through openings formed in the side walls of the body 5. When the steering wheel is in normal position the fastening 8 occupies a position at the rear end of the slot 3 and when the steering wheel is moved forward and tilted the fastening 8 occupies a position at the forward end of the slot 3. The two extreme positions of the fastening 8 are shown by full and dotted lines in Fig. 2. A spring actuated latch 10 mounted upon the steering wheel engages the head 2 and holds the steering wheel in normal position, as indicated by the full lines in Fig. 2. The latch 10 is slidably mounted in an end of the body 5 and a cross bar 11 connecting the adjacent arms of the spider. An expansible helical spring 12 mounted upon the latch between the cross bar 11 and body 5 normally exerts a pressure to hold the latch in engagement with the head 2.

It is observed that the steering wheel is mounted upon the steering rod to receive a sliding and a tilting movement. The tilting movement throws the steering wheel into upright position whereas the sliding movement carries the steering wheel forwardly of the steering rod to admit of such steering wheel occupying a position to give a maximum amount of clearance space between the seat and the steering wheel so that access to the machine or egress therefrom may be effected with the greatest ease and convenience. When the steering wheel is in normal position the side walls of the recess 7 engage the side walls of the head 2 so that turning of the steering wheel in one direction or the other results in a corresponding movement of the head 2 and rod 1. When the steering wheel is to be adjusted to obtain increased space between the steering wheel and seat the latch 10 is operated to effect disengagement thereof from the head 2 after which the steering wheel is tilted and moved forward when it assumes an approximately upright position, as indicated by the dotted lines in Fig. 2. The pin or fastening 8 constitutes both a sliding and pivotal connecting means between the steering wheel and head 2. The pin 8 in conjunction with the latch 10 holds the steering wheel in normal position. By having the recess 7 formed in the under side of the body 5, the latter constitutes a housing and prevents foreign matter from entering and lodging between the body 5 and head 2.

The openings in the side walls of the body 5 are elongated forming slots 13. These slots admit of a limited sliding movement of the steering wheel so that the lower portion when tilted may be of greater weight than the upper portion, thereby holding such wheel in the tilted position as indicated by the dotted lines in Fig. 2. Moreover, the slots 13 and the slot 3 admit of the bent end of the fastening 8 passing therethrough when placing the fastening in position after the steering wheel has been properly positioned upon the head of the steering rod.

It is to be understood that while the invention is designed most especially for the hand steering wheels of automobiles and motor vehicles generally it may be adapted to the steering wheels of motor craft of every description, such as flying machines and boats. The coöperating parts such as the head 2 and body 5 may be of any relative formation depending upon the special design and particular use for which the steering gear is designed.

Having thus described the invention, what is claimed as new is:—

1. In steering gear of the character specified embodying a steering rod and a steering wheel, a head connected with the steering rod and formed with a longitudinal slot, a body having connection with the steering wheel and recessed in its under side to house the said head upon which it is mounted to slide transversely of the rod and tilt, a fastening carried by the body and passing through the longitudinal slot of the head and forming both pivotal and sliding connecting means, and other fastening means for locking the steering wheel in normal position and against both sliding and tilting movement.

2. In steering gear of the character specified, an oblong head connected with the steering rod and having a longitudinal slot formed in an end portion, a steering wheel comprising a body portion having an oblong recess formed in its under side to inclose the said head, a fastening passing through the said slot and supported at its ends in the side walls of said recess, and other fastening means mounted upon the steering wheel and adapted to engage the head to hold the steering wheel in normal position and prevent movement of the same upon the rod.

3. In steering gear of the character set forth, an oblong head connected with the steering rod and having its forward end in normal horizontal position and formed with a longitudinal slot and having its rear end downwardly inclined, a steering wheel comprising a body portion having an oblong recess in its under side to receive the said head upon which it is mounted to slide and tilt, a fastening forming pivotal and sliding connection between the body portion of the steering wheel and the said head, and other fastening means mounted upon the steering wheel and adapted to engage the said head to hold the steering wheel in normal position.

4. In steering gear of the character specified, a steering rod provided with a head in which is formed a slot, a steering wheel mounted upon the head and adapted to slide and tilt thereon, and a fastening device passing through the slot in the head of the steering rod and having a sliding connection with the steering wheel.

In testimony whereof, I affix my signature.

JUDSON COOK. [L. S.]